United States Patent [19]

Hasegawa

[11] Patent Number: 5,555,236
[45] Date of Patent: Sep. 10, 1996

[54] MAGNETO-OPTICAL RECORDING METHOD OF ERASING A PORTION OF A FIRST RECORDING DOMAIN TO FORM A CRESCENT-SHAPED SECOND RECORDING DOMAIN

[75] Inventor: Koyo Hasegawa, Tokyo, Japan

[73] Assignee: Canon Kabushiki Kaisha, Tokyo, Japan

[21] Appl. No.: 428,000

[22] Filed: Apr. 25, 1995

Related U.S. Application Data

[63] Continuation of Ser. No. 111,271, Aug. 24, 1993, abandoned, which is a continuation of Ser. No. 780,092, Oct. 17, 1991, abandoned.

[30] Foreign Application Priority Data

Oct. 19, 1990 [JP] Japan ..................................... 2-278938

[51] Int. Cl.$^6$ ....................................................... G11B 7/00
[52] U.S. Cl. ............................. 369/116; 369/54; 369/110
[58] Field of Search ..................................... 369/116, 100, 369/109, 32, 44.39, 54, 58, 110, 13

[56] References Cited

U.S. PATENT DOCUMENTS

| | | | |
|---|---|---|---|
| 4,935,915 | 6/1990 | Fujiwara et al. | 369/116 |
| 4,982,389 | 1/1991 | Nakao et al. | 369/116 |
| 5,043,960 | 8/1991 | Nakao et al. | 369/54 |
| 5,062,091 | 10/1991 | Maeda et al. | 369/54 |
| 5,065,377 | 11/1991 | Spruit et al. | 369/116 |
| 5,077,714 | 12/1991 | Katayama et al. | 369/100 |
| 5,093,822 | 3/1992 | Kugiya et al. | 369/100 |

FOREIGN PATENT DOCUMENTS

| | | |
|---|---|---|
| 0328667 | 8/1989 | European Pat. Off. . |
| 0383386 | 8/1990 | European Pat. Off. . |
| 57-186248 | 11/1982 | Japan . |
| 62-175948 | 8/1987 | Japan . |
| 02033749 | 2/1990 | Japan . |

OTHER PUBLICATIONS

Patent Abstracts of Japan, Kokai No. 57–195303, vol. 7, No. 48, 2/1983.

*Primary Examiner*—Georgia Y. Epps
*Assistant Examiner*—Muhammad N. Edun
*Attorney, Agent, or Firm*—Fitzpatrick, Cella, Harper & Scinto

[57] ABSTRACT

A magneto-optical recording method is disclosed. A first recording domain is formed by the application of light having a predetermined energy level to a magneto-optical recording medium. A portion of the first recording domain is erased to thereby form a second recording domain having a crescent shape by the application of light having an energy level less than the predetermined energy level subsequent to the application of the light having the predetermined energy level.

4 Claims, 8 Drawing Sheets

MAGNETO-OPTICAL RECORDING METHOD OF ERASING A PORTION OF A FIRST RECORDING DOMAIN TO FORM A CRESCENT-SHAPED SECOND RECORDING DOMAIN

This application is a continuation of prior application Ser No. 08/111,271 filed Aug. 24, 1993, which application is a continuation of prior application Ser. No. 07/780,092 filed Oct. 17, 1991, both now abandoned.

BACKGROUND OF THE INVENTION

1. Field of the Invention

This invention relates to a magneto-optical recording method of recording information on a magneto-optical recording medium.

2. Related Background Art

The information overwriting method using a magneto-optical recording medium is broadly divided into the light modulation system and the magnetic field modulation system. The light modulation system includes the light modulation overwrite system utilizing the difference in thermal magnetic characteristics between two layers of a magnetic film, i.e., a recording layer and an auxiliary layer, as described, for example, in Japanese Patent Application Laid-Open No. 62-175948.

On the other hand, the magnetic field modulation system is a system as described, for example, in Japanese Patent Application Laid-Open No. 57-186248 wherein a light beam is applied a to magneto-optical recording film and at the same time, an extraneous magnetic field modulated in conformity with a recording signal is applied to the region of the film to which the light beam is applied, whereby the direction of magnetization is changed in conformity with recording information to thereby accomplish the recording of information.

Figure 1:
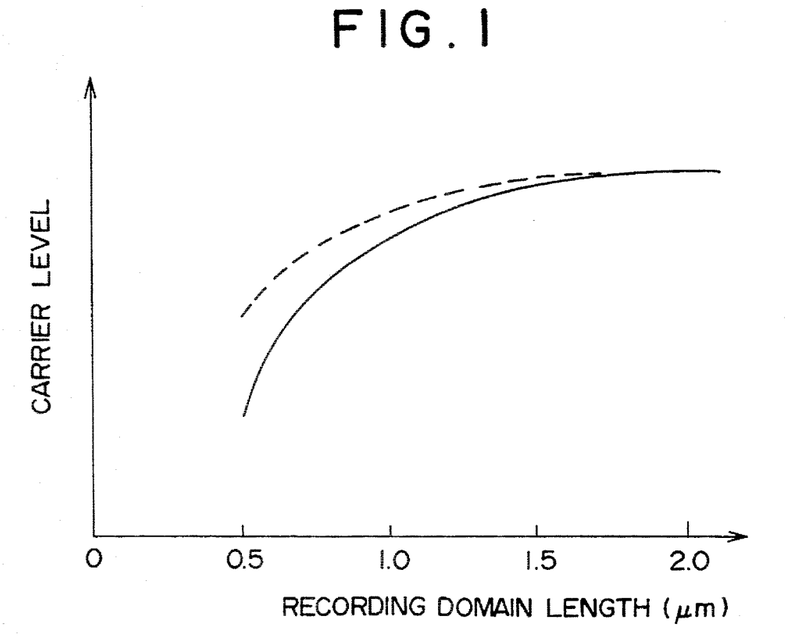
FIG. 1 is a graph showing the relation between recording domain length and carrier level by a comparison between light modulation recording and magnetic field modulation recording.
Figure 2:
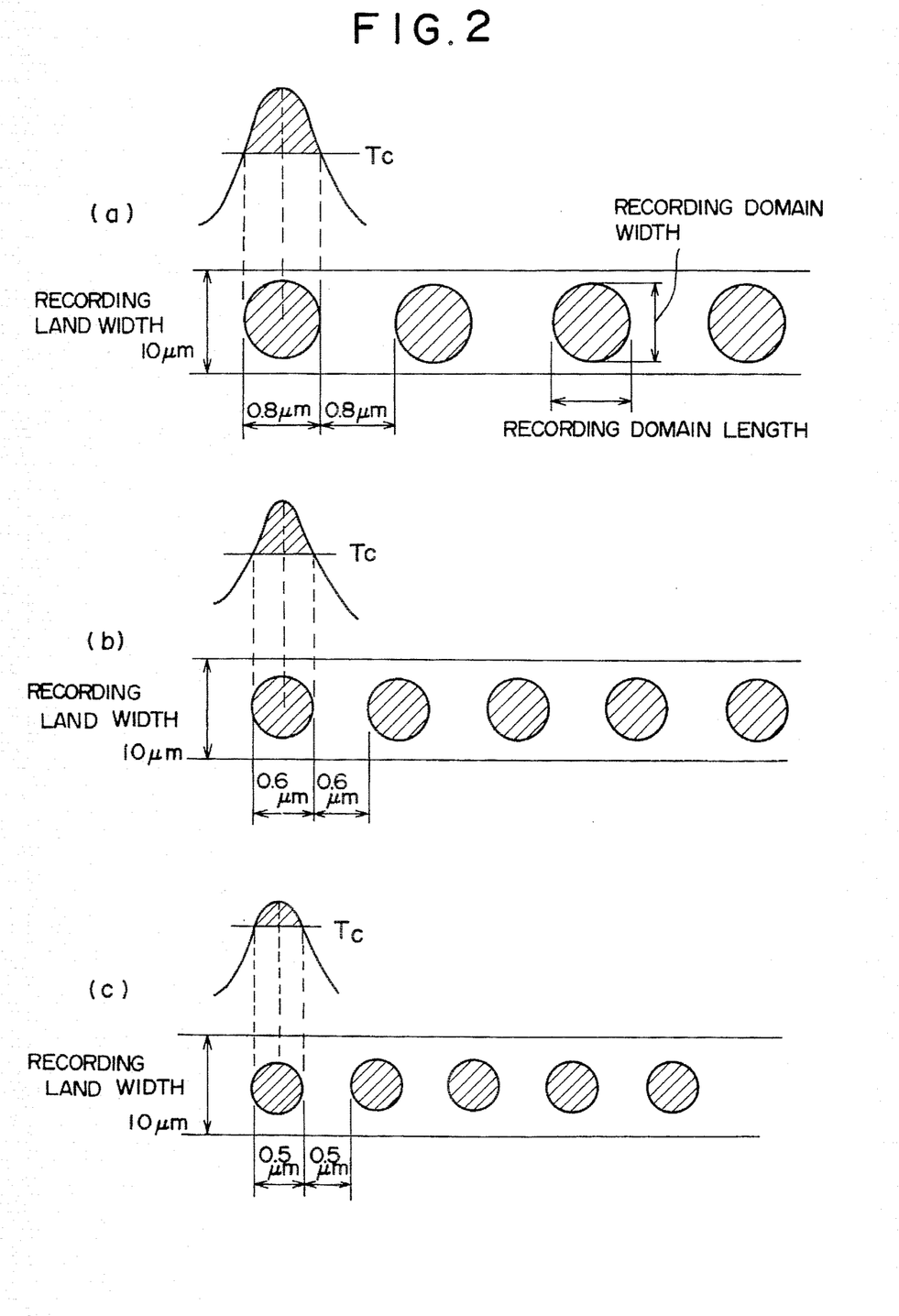
FIG. 2 illustrates the relations between the temperature distribution of a recording layer by the application of light and the recorded domain in light modulation recording.

However, in the overwriting system using two layers of magnetic film and the light modulation overwriting system utilizing an anti-magnetic field, when the recording domain length becomes short as indicated by a solid curve in FIG. 1 of the accompanying drawings, the carrier level corresponding to the amplitude of a reproduction signal is greatly reduced. FIG. 2 of the accompanying drawings shows the relation between the temperature distribution of a recording layer by the application of light and the recorded domain. When the laser recording wavelength is 780 nm and the N.A. (Numeral Aperture) of an objective lens is 0.53, the laser beam diameter is approximately 1.4 µm. Also, this is an example in which the recording land width is 1.0 µm and the domain was formed at a duty of 50%. In the light modulation recording system, when laser light is applied, the temperature distribution of the magneto-optical recording layer becomes a substantially Gaussian distribution and domains are formed in areas wherein the temperature is about $T_C$ or higher. Accordingly, the recording domain length and the recording domain width were made substantially the same. FIG. 2(a) shows an example in which the recording domain length is 0.8 µm, FIG. 2(b) shows an example in which the recording domain length is 0.6 µm, and FIG. 2(c) shows an example in which the recording domain length is 0.5 µm. There has been the problem that when the recording domain length decreases thusly, the carrier level is greatly reduced as already noted.

Figure 3:
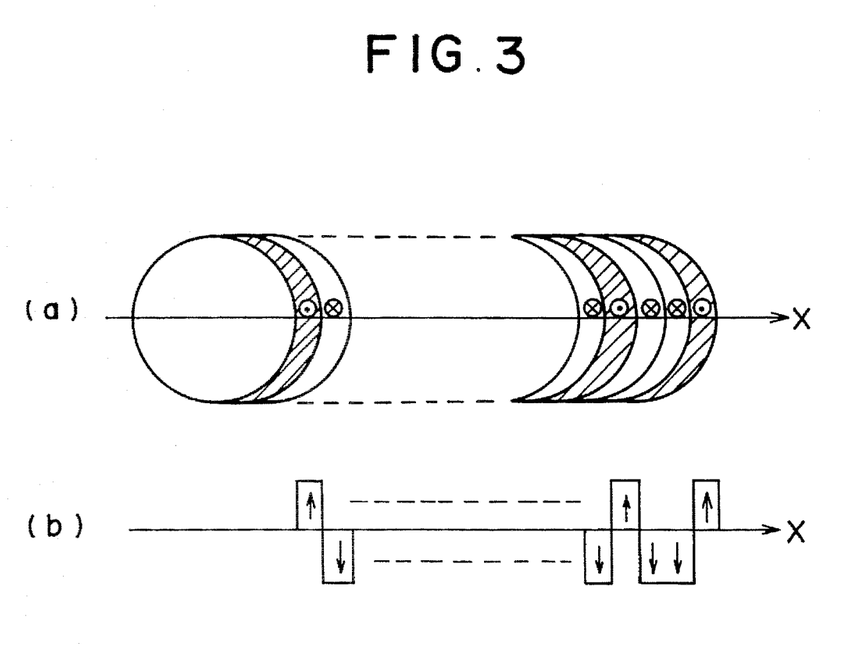
FIG. 3 illustrates the relations between the direction of an applied magnetic field and the recorded domain in the magnetic field modulation system.

On the other hand, the magnetic modulation system is a system as shown in FIG. 3(b) of the accompanying drawings wherein upward and downward modulation extraneous magnetic fields are applied to a magneto-optical recording layer to thereby change the direction of magnetization to upward and downward directions. Accordingly, domains formed are of a substantially constant domain width, irrespective of the magnitude of the recording domain length, as shown in FIG. 3(a) of the accompanying drawings. Consequently, as indicated by a dotted curve in FIG. 1, the reduction in the carrier level caused by a decrease in the recording domain length becomes smaller than in the light modulation recording method.

However, in the magnetic field modulation system, the recording speed is limited by the magnetic field modulation speed and therefore, high-speed recording has been difficult. Not only has there been the possibility of crushing of a floating magnetic head or the like, but also the need for additional devices such as a magnetic head and a driver therefor has been increased, and this has led to the problem that the apparatus becomes complicated and bulky.

SUMMARY OF THE INVENTION

The present invention has been made to eliminate such problems and the object thereof is to provide a magneto-optical recording method which is free of a reduction in carrier level and can obtain a good reproduction signal amplitude.

Such an object of the present invention is achieved by a magneto-optical recording method characterized in that a first recording domain is formed by the application of light of predetermined energy to a magneto-optical recording medium, and after the application of the light, by the application of light of energy smaller than the light energy, a portion of the first recording domain is erased to form a crescent second recording domain.

DESCRIPTION OF THE PREFERRED EMBODIMENTS

Some embodiments of the present invention will hereinafter be described in detail with reference to the drawings. Description will first be made of a magneto-optical recording medium used in the present embodiment.

Figure 4:
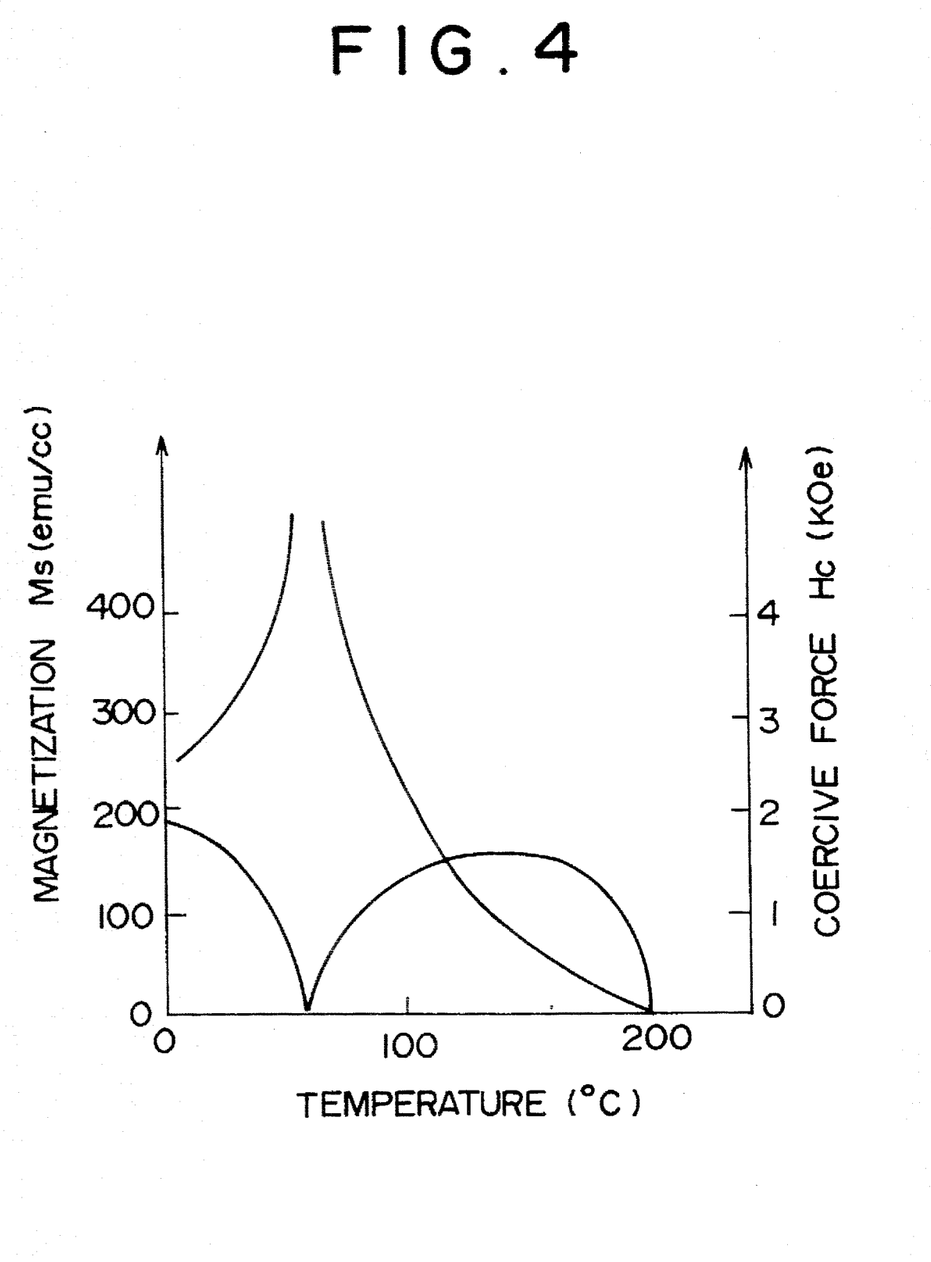
FIG. 4 is a graph showing the characteristics of a magneto-optical recording medium used in the present invention.

The magneto-optical recording film used is a GdTbFeCo film which is a rare earth-transition metal thin film. FIG. 4 shows the temperature characteristics of this film, and particularly shows the relations among magnetization Ms (lmu/cc) and coercive force Hc (KOe) and temperature. As is apparent from a FIG. 4, the recording film in the present embodiment is a ferromagnetic material thin film having a compensation point temperature of about 80° C. and a curie point temperature of about 200° C.

Figure 5:
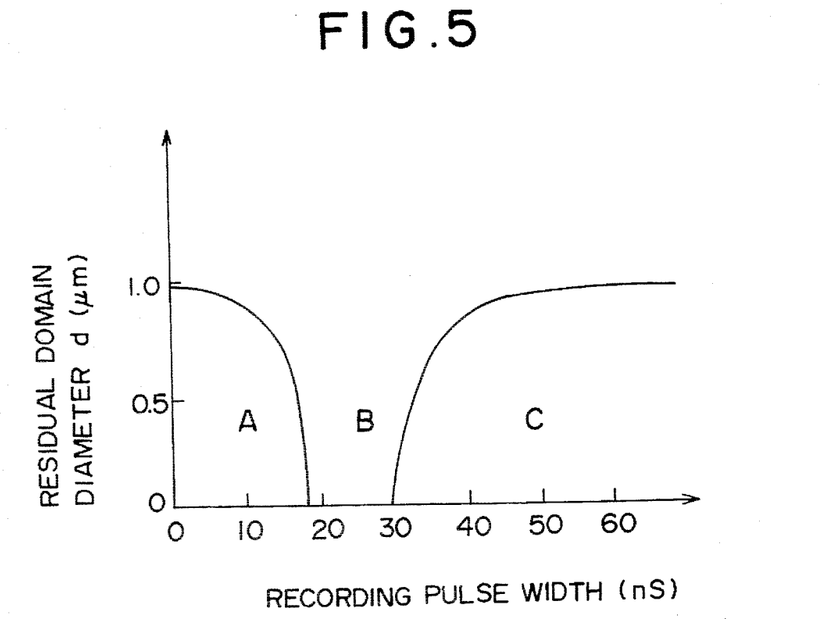
FIG. 5 is a graph showing the relation between recording pulse width and residual domain diameter when there is a history forming domain.

A recording domain of about 1.0 μm was pre-recorded on such a magneto-optical recording film, whereafter overwriting was effected with the pulse width of a laser varied at the same recording laser power. FIG. 5 shows the relation between the recording pulse width obtained at that time and the residual domain diameter. The recording bias magnetic field at that time was about 20 Oe in the recording direction. The result is divided into three areas (A), (B) and (C), as shown in FIG. 5. The area (A) in which the recording pulse width is 18 ns or less is an area in which light irradiation energy for erasing is little and the history domain cannot be erased. The area (B) in which the recording pulse width is 18–30 ns is an area of a recording condition in which the history domain can be completely erased. The area (C) in which the recording pulse width is 30 ns or more is an area a recording condition in which a domain can be formed independently of the history domain.

Figure 6:
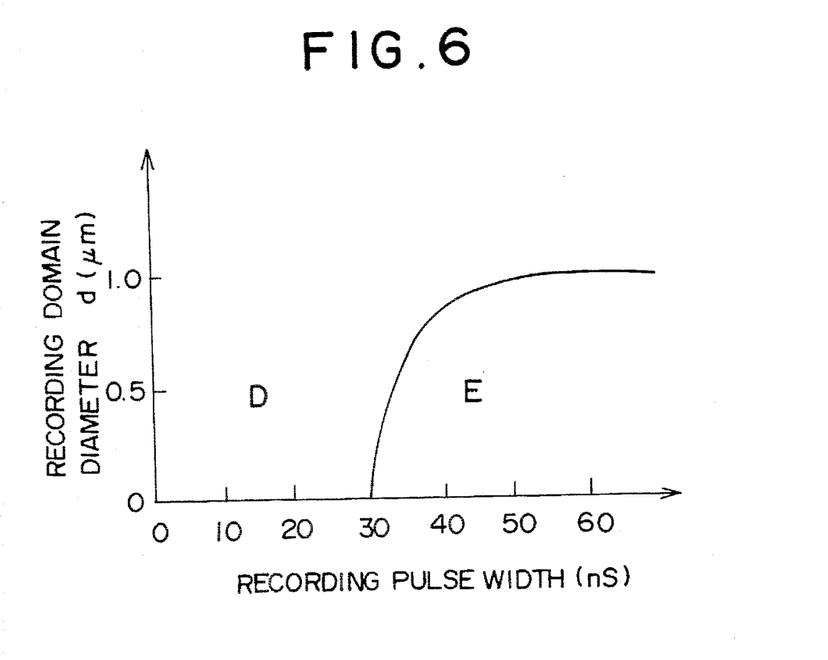
FIG. 6 is a graph showing the relation between recording pulse width and recording domain diameter when there is no history forming domain.

FIG. 6 shows the relation between recording pulse width and recording domain diameter when there is no history recording domain. As is apparent from FIG. 6, no domain is formed in an area (D) wherein the recording pulse width is 0–30 ns, and a domain is formed in an area (E) wherein the recording pulse width is 30 ns or more.

From the results of FIGS. 5 and 6, it is seen that if the recording pulse width is set to 18–30 ns, there can be brought about a state in which no domain is formed, i.e., an erased state, after overwriting, irrespective of the history state. Also, if the recording pulse width is set to 30 ns or more, a domain will be formed after overwriting, irrespective of the history state, and recording can be effected. The overwriting utilizing the movement of the magnetic wall by the effect of the anti-magnetic field in FIGS. 5 and 6 is an overwriting technique using two phenomena, i.e., erasing of light irradiation by low energy, and the formation of a domain by light irradiation of high energy. In FIGS. 5 and 6, the control of the low and high light irradiation energies is accomplished by changing the recording pulse width, but the control of light energy is possible even if the recording pulse width is made constant and the light energy, in other words, the crest value, is changed.

An overwriting system utilizing movement of the magnetic wall of the formed domain by an anti-magnetic field in the temperature rise and cooling process by the laser light irradiation as described above is described in Japanese Patent Application Laid-open No. 2-33749. This system utilizing the movement of the magnetic wall forms a recording domain by recording laser power determined by recording conditions and the pulse width thereof, with an extraneous magnetic field applied or a relatively weak extraneous magnetic field applied.

The present invention is a magneto-optical recording method utilizing the above-described overwriting system utilizing the movement of the magnetic wall of the formed domain by the anti-magnetic field in the temperature rise and cooling process by laser light irradiation.

Description will now be made of a magneto-optical recording apparatus used in the magneto-optical recording method of the present invention.

Figure 7:
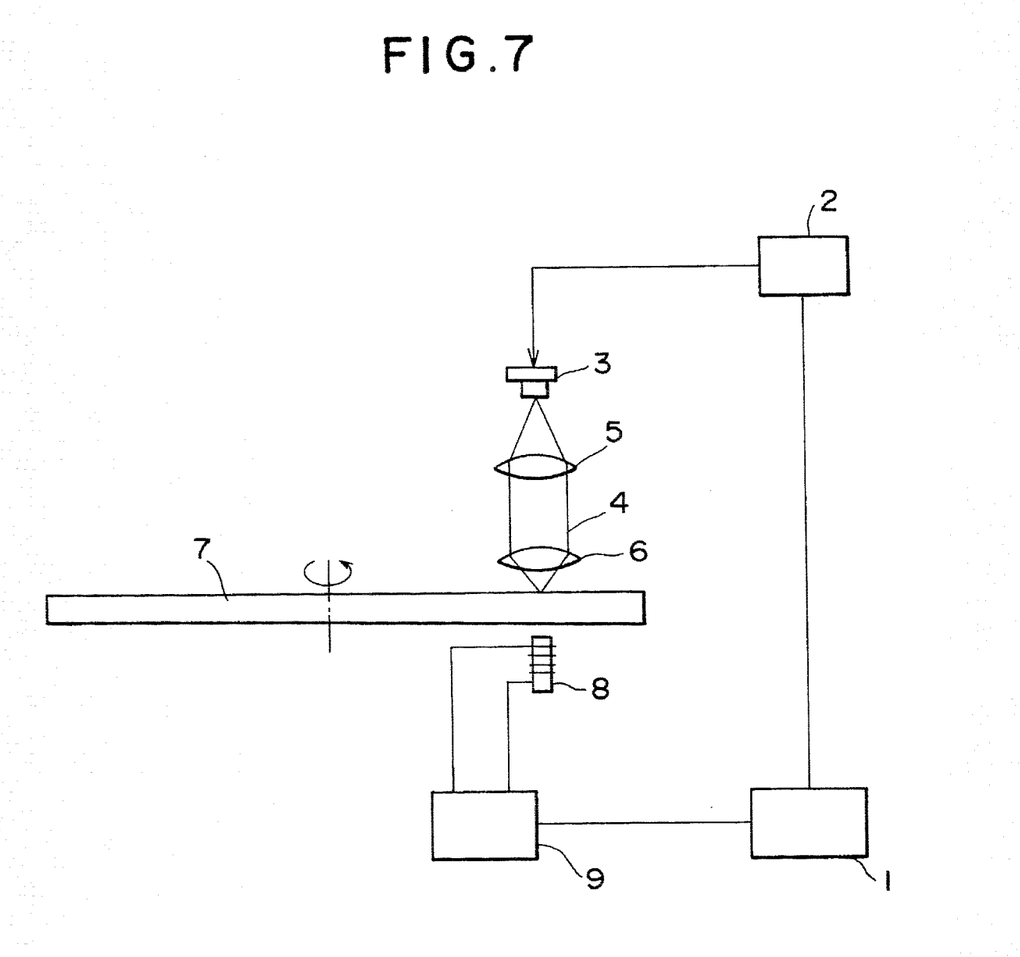
FIG. 7 shows a magneto-optical recording apparatus used to carry out the magneto-optical recording method of the present invention.

In FIG. 7, laser light 4 emitted from a laser source 3 is modulated by a recording signal made by a recording signal modulator 2. The laser light 4 emitted by the laser source 3 passes through a collimator lens 5 and an objective lens 6 and irradiates a magneto-optical recording medium 7. At the same time, a magnetic head 8 provided in opposed relationship with an optical head with the recording medium interposed therebetween is driven by a driving circuit 9, and an extraneous magnetic field is applied to the recording medium. The reference numeral 1 designates a control unit for controlling the recording signal modulator 2 and the driving circuit 9.

Figure 8:
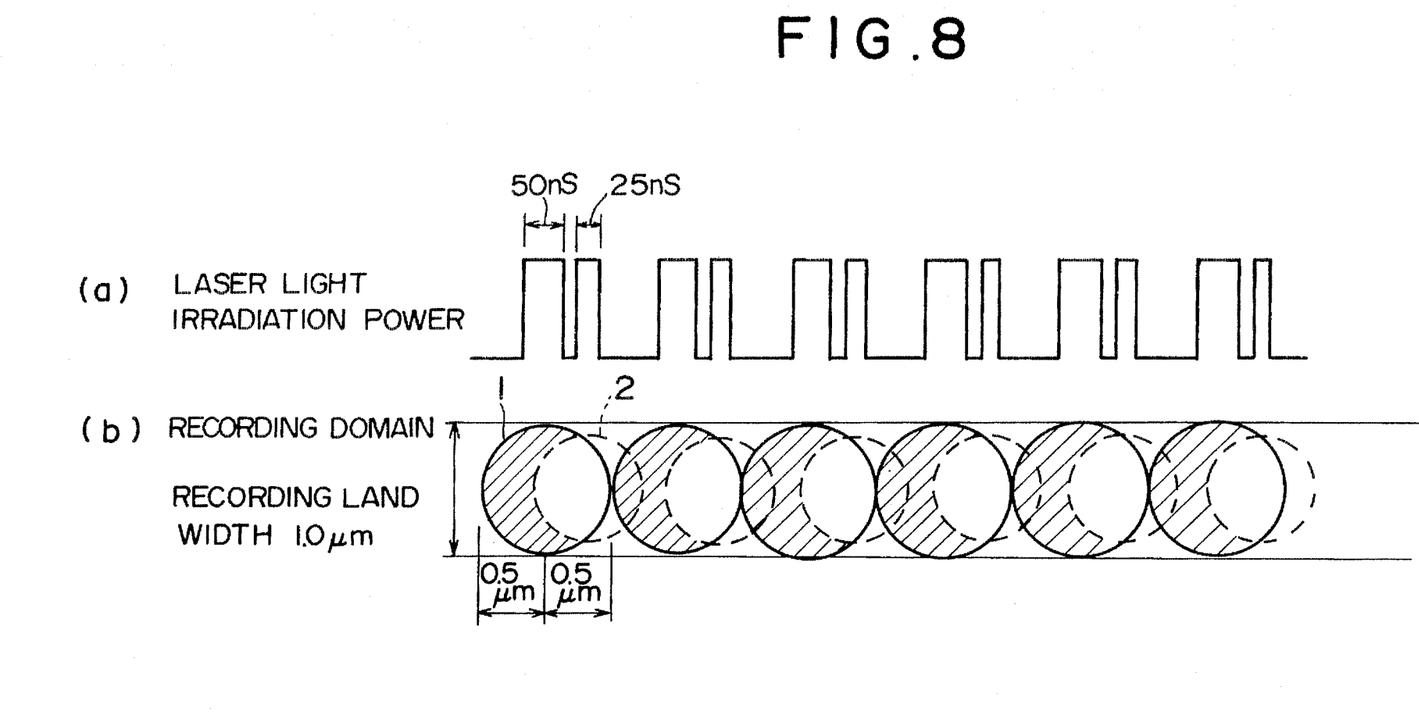
FIG. 8 shows the magneto-optical recording method of the present invention, and particularly the relation between the pulse of light irradiation and the formed domain.

An embodiment of the magneto-optical recording method of the present invention will now be described with reference to FIG. 8. In FIG. 8, recording is effected so that the duty of the reproduction signal of the recording domain after overwriting and the reproduction signal in the erased state may be 50%.

FIG. 8(a) shows laser light applied to the recording medium, and the laser light is applied with the recording pulse width thereof changed over alternately to 50 ns and 25 ns. FIG. 8(b) shows recording domains formed by the application of this laser light.

In the present embodiment, recording was effected so that as shown in FIG. 8, after overwriting, the recording domain length and the unrecorded domain length might be approximately 0.5 μm and approximately 0.5 μm, respectively, on a track having a recording land width of 1.0 μm. In this case, the recording pulse width of the laser irradiation when the recording domain is formed is 50 ns as shown in FIG. 8(a), and as the result, a circular recording domain 1 having a diameter of approximately 1.0 μm is formed as shown in 1 FIG. 8(b). At this time, recording domains corresponding to the recording conditions of the area (C) of FIG. 5 are formed.

Next, as shown in FIG. 8(a), laser light irradiation having a recording pulse width of 25 ns is effected immediately after the laser light having a recording pulse width of 50 ns. This corresponds to the area (B) of FIG. 5, and effects erasing. By this laser light irradiation, as shown in FIG. 8(b), a circular erasing portion 2 is formed in an area including a portion of the recording domain 1. As the result, a crescent domain indicated by hatching in FIG. 8(b) remains, and this remains as a recording domain.

The domain width of the domain formed by such recording can be widely recorded up to the full recording land width, and the recording domain length does not decrease with a decrease in the recording domain width. Accordingly, the characteristics of the carrier level to the recording domain length become similar to that in the magnetic field modulation system indicated by the dotted curve in FIG. 1, and as compared with the prior art, the reduction in the carrier level can be greatly suppressed.

When recording domains are to be formed not in the continuous form as shown in FIG. 8, but in spaced apart relationship with one another, light irradiation of 25 ns can be effected a necessary number of times after the light irradiation of 50 ns.

Figure 9:
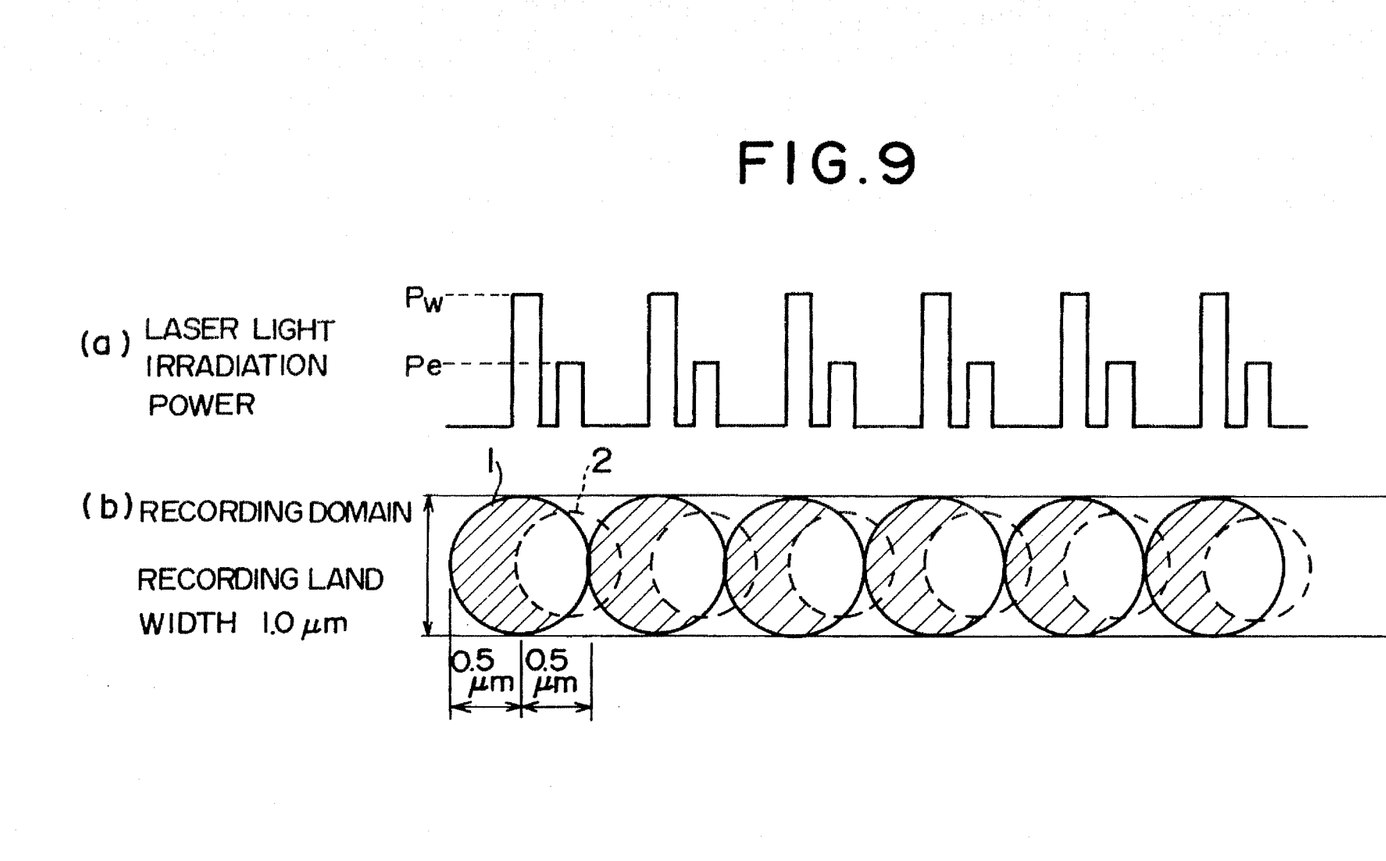
FIG. 9 and 10 show further embodiments of the present invention.

FIG. 9 shows another embodiment of the present invention. In this embodiment, the control of light energy was effected by keeping the pulse width constant and changing its crest value, instead of changing the pulse width of recording and erasing. That is, as shown in FIG. 9(a), laser light of light power $P_w$ was applied and immediately after that, laser light of light power $P_e$ weaker than the light power $P_w$ was applied. By this application of laser light, circular recording domains 1 are formed as shown in FIG. 9(b), and circular erasing portions 2 are formed. As the result, crescent domains are formed and an effect entirely similar to that of the previous embodiment is obtained.

Figure 10:
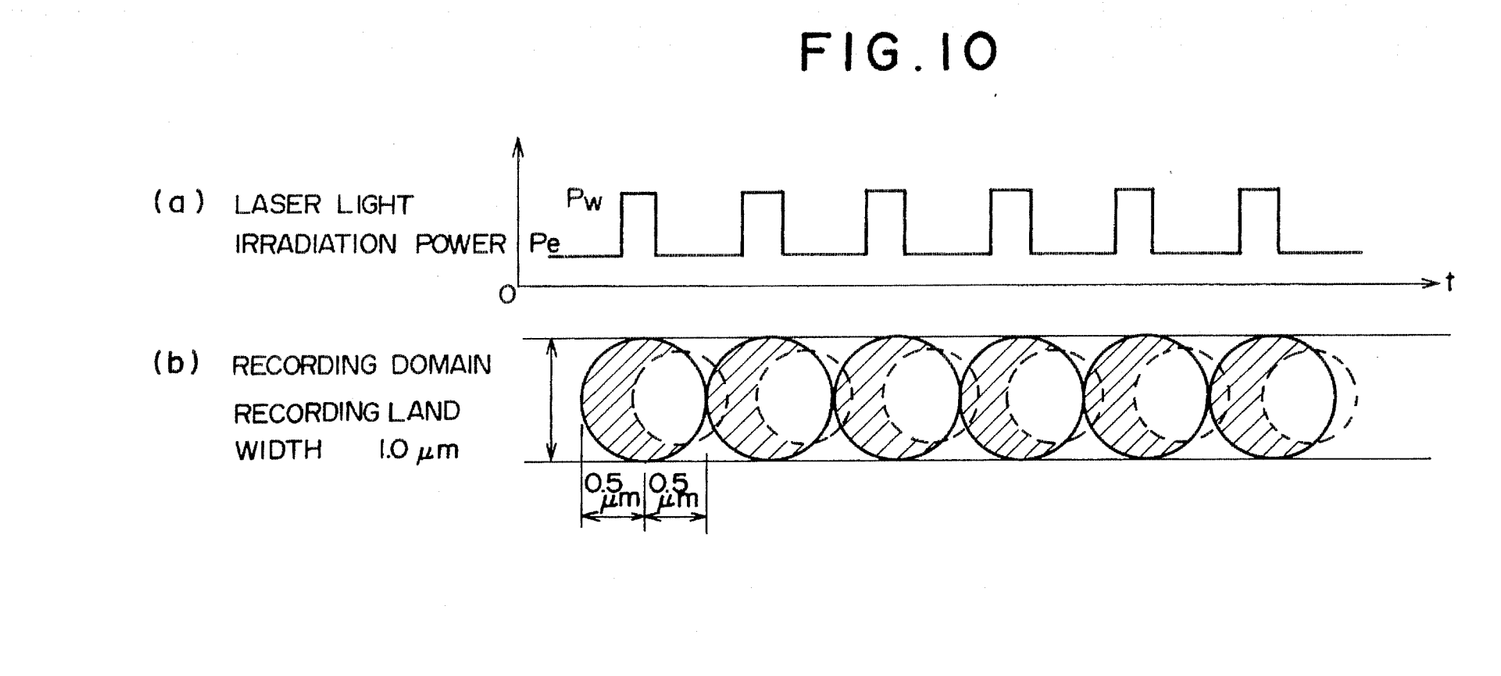

FIG. 10 shows still another embodiment of the present invention. This embodiment is a modification of the embodiment of FIG. 9, and is an embodiment in which as shown in FIG. 10(a), a constant amount of light power Pe for erasing is normally applied and light power Pw for forming domains is superposed thereon. When the light power is controlled in this manner, the formation and erasing of recording domains are effected as shown in FIG. 10(b), and as in the embodiments of FIGS. 8 and 9, crescent domains are formed. Accordingly, again in this embodiment, there can be obtained an effect entirely similar to that of the aforedescribed two embodiments.

As described above, the magneto-optical recording method of the present invention is a method in which a first recording domain is formed by the application of light of predetermined energy, and after the application of the light, a portion of the first recording domain is erased by the application of light of energy smaller than the light energy to thereby form a crescent second recording domain.

Also, in the above-described method, the first recording domain is formed over substantially the full recording land width.

Also, in the above-described method, the control of the light energies of the light irradiation for forming the first recording domain and the light irradiation for effecting the erasing is accomplished by changing the pulse width of the light irradiation.

Also, in the above-described method, the control of the light energies of the light irradiation for forming the first recording domain and the light irradiation for effecting the erasing is accomplished by changing the crest value of the pulse of the light irradiation.

As described above, according to the present invention, there can be formed recording domains which are formed by light modulation recording and yet are free of a reduction in carrier level. Accordingly, there can be obtained a good reproduction signal and thus, there can be provided an apparatus of low error rate. There is no possibility of crushing a floating magnetic head or the like as is experienced in the magnetic field modulation system, and further any additional devices such as a magnetic head is unnecessary. Therefore, there can be realized a highly reliable, compact and simple light modulation overwriting apparatus.

What is claimed is:

1. A magneto-optical recording method, comprising the steps of:

forming a first recording domain on a magnetooptical recording medium by applying light having a first pulse width to the recording medium; and thereafter, erasing a portion of the first recording domain to thereby form a second recording domain having a crescent shape, by applying light having a second pulse width, different from the first pulse width, to a portion of the recording medium including the first recording domain, wherein the second pulse width is smaller than the first pulse width and the power of the light having the first pulse width applied to the recording medium is the same as the power of the light having the second pulse width applied to the recording medium.

2. A method according to claim 1, wherein the first recording domain is formed over substantially a full width of a recording land on the recording medium.

3. A magneto-optical recording method, comprising the steps of:

forming a first recording domain on a magnetooptical recording medium by applying light having a first pulse width to the recording medium; and thereafter, erasing a portion of the first recording domain to thereby form a second recording domain having a crescent shape, by applying to a portion of the recording medium including the first recording domain light having a second pulse width, a crest of which is different from that of the first pulse width, wherein the first pulse width is the same as the second pulse width and the power of the light having the first pulse width applied to the recording medium is greater than the power of the light having the second pulse width applied to the recording medium.

4. A method according to claim 3, wherein the first recording width is formed over substantially a full width of recording land on the recording medium.

* * * * *

UNITED STATES PATENT AND TRADEMARK OFFICE
CERTIFICATE OF CORRECTION

PATENT NO. : 5,555,236
DATED : September 10, 1996
INVENTOR(S) : KOYO HASEGAWA

It is certified that error appears in the above-indentified patent and that said Letters Patent is hereby corrected as shown below:

ON THE COVER PAGE:

Under "FOREIGN PATENT DOCUMENTS," item [56]

"02033749" should read --2-033749--.

Under "ABSTRACT," item [57]

Line 7, "level subsequent" should read --level, subsequent--.

COLUMN 1

Line 40, "an anti-magnetic" should read --a demagnetizing--.

UNITED STATES PATENT AND TRADEMARK OFFICE
CERTIFICATE OF CORRECTION

PATENT NO. : 5,555,236
DATED : September 10, 1996
INVENTOR(S) : KOYO HASEGAWA

It is certified that error appears in the above-indentified patent and that said Letters Patent is hereby corrected as shown below:

COLUMN 2

Line 65, "FIG." should read --FIGS.--.

COLUMN 3

Line 29, "area" should read --area of--;
Line 46, "anti-magnetic" should read --demagnetizing--;
Line 47, "of" should read --with--;
Line 54, "an anti-magnetic" should read --a demagnetizing--.

COLUMN 4

Line 2, "anti-magnetic" should read --demagnetizing--;
Line 38, "1" should be deleted.

UNITED STATES PATENT AND TRADEMARK OFFICE
CERTIFICATE OF CORRECTION

PATENT NO. : 5,555,236  Page 3 of 3
DATED : September 10, 1996
INVENTOR(S) : KOYO HASEGAWA It is certified that error appears in the above-indentified patent and that said Letters Patent is hereby corrected as shown below:

COLUMN 6

Line 5, "is" should read --are--.
Line 10, "magnetooptical" should read --magneto-optical--;
Line 29, "magnetooptical" should read --magneto-optical--;
Line 45, "recording" should read --a recording--.

Signed and Sealed this

Eighteenth Day of March, 1997

Attest:

BRUCE LEHMAN

Attesting Officer    Commissioner of Patents and Trademarks